July 14, 1953  A. W. TRONNIER  2,645,156
FIVE-LENS PHOTOGRAPHIC OBJECTIVE COMPRISING
THREE MEMBERS SEPARATED BY AIRSPACE
Filed Sept. 12, 1950

INVENTOR.
ALBRECHT WILHELM TRONNIER
BY Mock + Blum
ATTORNEYS

UNITED STATES PATENT OFFICE 2,645,156

FIVE-LENS PHOTOGRAPHIC OBJECTIVE COMPRISING THREE MEMBERS SEPARATED BY AIR SPACES

Albrecht Wilhelm Tronnier, Gottingen, Germany, assignor to Voigtlander & Sohn Aktiengesellschaft, Braunschweig, Germany, a corporation of Germany Application September 12, 1950, Serial No. 184,455
In Switzerland October 17, 1949

4 Claims. (Cl. 88—57)

This invention relates to a five-lens photographic objective comprising three members separated by intermediate air spaces. It has particular relation to a new and improved five-lens photographic objective of this type, in which each of the two outer members is composed of two individual lenses of opposite power, which are cemented together in such a manner that the cemented contact surface has a converging effect. Objectives of this type were first suggested and developed by H. Harting in 1899–1900 and are known in the art as Heliar-type objectives.

One of the objects of the present invention consists in providing new and improved Heliar-type objectives of high light-transmitting capacity, showing improved quality of the photographic image in the lateral portions of the field of vision.

Another object of my invention is to provide new and improved Heliar-type objectives of high light-transmitting capacity, showing a particularly fine correction, outside the optical axis, of chromatic transverse aberrations for several colors, i. e. over a relatively wide spectral range.

Numerous other objects, advantages and features of the invention are set forth in the following description and the annexed drawings which include a preferred example of the invention to which the invention is not limited.

Figure 1:
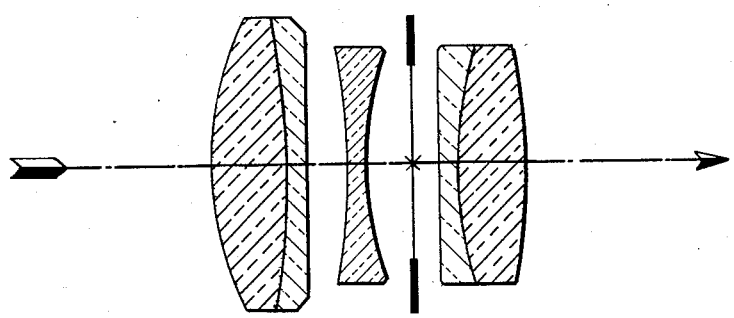

In the drawings, Figure 1 is a vertical axial section of the improved objective, taken along its optical axis. The horizontal optical axis is indicated by the horizontal arrow, which also indicates the direction of the light, from the left to right. The object space is at the left of the objective, and the image space is at the right of the objective.

Figure 2:
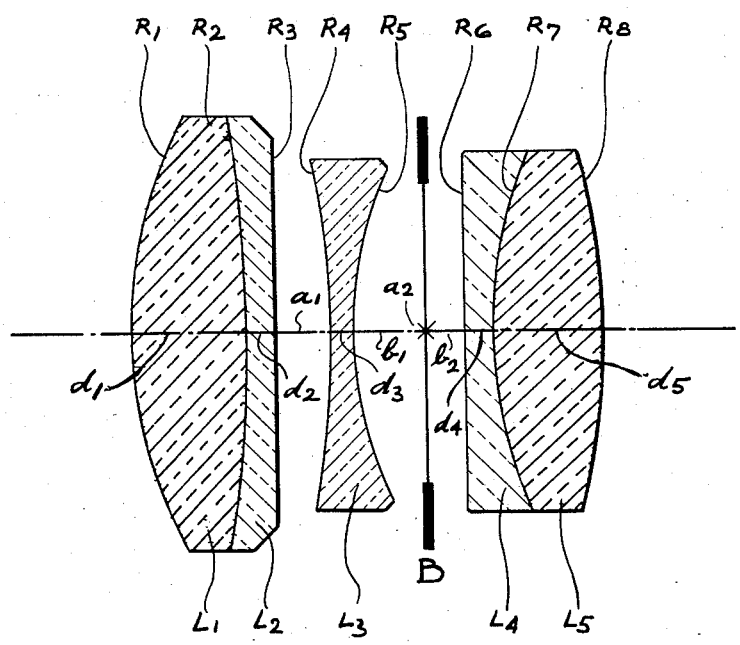

Figure 2 is a view substantially similar to that shown in Figure 1 and includes certain reference symbols explained in detail further below.

The photographic objective of my invention is composed of five lenses and comprises the following members arranged in the direction of light to the photographic image: (a) a front member consisting of two cemented lenses of opposite power, the front lens of which is a converging lens and has a refractive index distinctly higher than 1.63 for yellow light; the cemented contact surface of said lenses has a converging effect and the equivalent focal length of said front member is in the range of 40/100 to 60/100 of the equivalent focal length of the total objective; (b) a diverging lens of unequal curvature, separated from said front member by an air-space, consisting of highly refractive barium-flint-glass having an Abbé number $\nu$ higher than 42, the curvature of said diverging lens being defined by the quotient resulting from division of its front radius by its rear radius, being in the range of 2.38 to 3.43, the focal length of said diverging lens being in the range of $-22/100$ to $-44/100$ of the equivalent focal length of the total objective; (c) an air-space containing the diaphragm; (d) a converging rear member consisting of two cemented lenses of opposite power, the rear lens of which is a biconvex converging lens and has a refractive index higher than 1.675 for yellow light, said lenses having a converging cemented contact surface convex relative to the diaphragm, the focal length of said rear member being in the range of 45/100 to 75/100 of the equivalent focal length of the total objective.

The above mentioned focal lengths are the reciprocal values of the corresponding refractive powers, which are expressed for the individual refractive surface by the quotient resulting from division of the difference of refractive numbers of the media in front of and behind the refractive surface, by its radius of curvature, i. e.

$$\frac{1}{f_1}=\varphi_1=\frac{n_i'-n_i}{R_i}$$

for any surface $i$. They form a fraction of the equivalent refractive power of the total objective and can be, therefore, defined by the general value of the radius of each surface, referred to the equivalent focal length. In this connection, the objective shows the following structural design:

$$0.24\ F<R_1<0.48\ F$$
$$0.48\ F<-R_2<1.68\ F$$
$$F<\pm R_3\leqq\infty$$
$$0.68\ F<-R_4<F$$
$$0.20\ F<R_5<0.36\ F$$
$$F<\pm R_6\leqq\infty$$
$$0.24\ F<R_7<0.48\ F$$
$$0.36\ F<-R_8<0.72\ F$$

$R_4$ and $R_5$ meet the special condition $$8.33<\frac{R_4}{R_5}\cdot Z<12.00$$

In the improved photographic Heliar-type objective of my invention the converging cemented surface in each of the two outer members is convex relative to the inner diverging lens and also relative to the diaphragm. Moreover, the surface refractive powers are not uniformly distributed to the two surfaces of the inner diverging lens. The refractive power of the latter is selected in such a manner that, in combination with the cemented front member which is arranged on the side of the longer conjugate and has a distinct converging effect, it has a relatively low negative or at most a weak positive combined refractive power, and, therefore, the course of parallel rays incident in the total system on the side of the longer conjugate, shows only a weakly divergent or almost parallel or at most a weakly convergent inclination relative to the optical axis between the inner biconcave lens of unequal curvature and the subsequent strongly converging cemented member located on the side of the shorter conjugate, i. e. in the rear airspace, used mostly as diaphragm space.

In order to obtain an improved image quality in the lateral portions of the field of vision, also in the case of Heliar-type objectives of very high light transmitting capacity, with special consideration of a particularly fine correction of chromatic transverse aberrations for several colors, i. e. over a relatively wide spectral range, in the improved objectives of high light transmitting capacity according to the present invention the lenses having the strongest individual refractive powers, i. e. primarily the two converging individual lenses of the cemented outer members, and the inner diverging lens, are made of barium glass, whereby, by the selection of glass, the secondary and tertiary chromatic aberrations can be reduced. For this purpose, the two converging lenses are made of barium-crown or special-barium-crown glass, while said biconcave lens of unequal curvature is made of a barium-flint glass, whereby the advantage of the relatively proportional course of the individual partial dispersions between barium-crown and barium-flint glasses is utilized for the reduction of chromatic residual aberrations of higher order.

According to the invention disclosed in my co-pending U. S. patent application for "Five-lens Photographic Objective" filed under Ser. No. 183,967 on September 9, 1950, in order to satisfactorily meet the Schwarzschild condition, in the objectives disclosed and claimed in said co-pending application, the converging lenses present in each of the two cemented outer members consist of glass of high refractive power, the refraction index of which for yellow light is distinctly higher than 1.63; moreover, the individual inner biconcave lens of unequal curvature consists of glass of likewise high refractive power, the Abbé number $\nu$ of which is higher than 42, whereby the range of barium flints is made available for this lens. Moreover, this uncemented negative lens is designed to meet the condition $$8.33 < \frac{R_V^{III}}{R_H^{III}} \cdot Z < 12$$

wherein $$R_V^{III}$$

is the radius of the front curvature, on the side of the longer conjugate, of the inner diverging lens;

$$R_H^{III}$$

is the radius of rear curvature of the inner diverging lens on the side of the shorter conjugate and, therefore, mostly adjacent the diaphragm; and Z is the aperture number of the initial relative aperture of the total objective.

Thus, the general curvature factor $P_D$ of this negative lens is expressed by the formula $$P_D = \frac{R_V^{III}}{R_H^{III}} \cdot Z$$

and the design according to my invention of the inner diverging barium-flint lens of unequal curvature must meet the condition $$8.33 < P_D < 12.00$$

By elimination of the aperture number Z by the aperture number f/3.5 of the example, said condition can be expressed as follows:

$$P_D' = \frac{P_D}{Z}$$

the limits being $$P_D' = \frac{8.33}{3.5} = 2.38$$

i. e. the lowest limit, and $$P_D' = \frac{12.00}{3.5} = 3.43$$

i. e. the highest limit for the curvature of lens $L_3$.

I have now found that a particularly fine correction of image defects can be obtained in objectives of very high light transmitting capacity embodying the invention disclosed in my above mentioned co-pending application by the use of certain steps forming the subject matter of my present invention.

According to these steps, the optical glasses forming the objective are arranged within the objective in such a manner that the glass of the converging lens on the side of the minor conjugate has a mean refraction index higher than 1.675 for yellow light and, simultaneously, the refraction index, for the same color, of the negative lens cemented together with said converging lens is distinctly smaller than the arithmetical mean of the refraction indices, for the same light, of the two other diverging lenses located in the direction of the major conjugate.

The object of my present invention, i. e. the obtaining of a substantially improved lateral image quality also in the use of objectives of very high light-transmitting capacity, is very satisfactorily attained by the before-mentioned selection of refraction indices of the glasses. For example, the highest astigmatic difference of 0.70 to 0.75%, within a field of vision, which is overlapped by an inclination of principal rays—with reference to the diaphragm space—of 30° relative to the optical axis, can be reduced to less than its half, i. e. to about 0.35% of the equivalent focal length of the total objective, an excellent correction of coma in these lateral image portions being obtained simultaneously.

Investigations made in connection with the present invention have shown that in the before-mentioned lateral image portions the residual chromatic aberrations too, may be particularly finely corrected, if in accordance with my invention within the range of the principle relative to the selection of the refraction indices the glasses are specifically selected in such a manner that on the two chromatically over-correcting cemented surfaces the distribution of the dispersions corresponds to the following conditions: The sum of the differences of $\nu$-values on both cemented surfaces is distinctly higher than 27.5 and simultaneously the $\nu$-value difference on the cemented surface turned to the side of the major conjugate is greater than 105%, but smaller than 205% of the $\nu$-value difference of the glasses which limit the other cemented surface turned to the side of the minor conjugate. For example, it is hereby possible to keep the chromatic difference of image height between the blue and yellow principal ray, the inclination of which in the diaphragm space toward the optical axis is 28.0°, smaller than 3/100,000 of the equivalent focal length of the total objective.

Thus, a decisive improvement of the Heliar-type objectives has been attained by the constructive and structural steps according to the present invention. Even at the high relative aperture of 1:3.5 and higher, the improved objectives of my invention show an outstanding sphero-chromatic correction and a secondary spectrum reduced to such an extent that, depending on their specific construction, these objectives are half-apochromates or even show a regular apochromatic correction.

The following table illustrates, by way of example, an embodiment of the new objectives of the present invention, which, at a relative aperture of 1:3.5, shows an anastigmatically flattened image field of almost 60°, an excellent sphero-chromatic correction and a particularly fine removal of chromatic lateral aberrations in the lateral image portions.

In accordance with Figure 2, in this example the radii of curvature of the lens surfaces are denoted $R_1$, $R_2$, $R_3$, $R_4$, $R_5$, $R_6$, $R_7$, $R_8$; the axial thickness of the lenses $d_1$, $d_2$, $d_3$, $d_4$, $d_5$ and their distance by $a_1$, $a_2$. The diaphragm B is located on the side of the minor conjugate in the rear air-space $a_2$. The distance of the diaphragm from the adjacent surface vertices having the radii $R_5$ and $R_6$, is denoted $b_1$ and $b_2$, respectively. The glasses used are characterized by their mean refraction index and the Abbé number $\nu$. The lenses are denoted $L_1$, $L_2$, $L_3$, $L_4$, $L_5$ and their mean refraction indices, for yellow light, $n_1$, $n_2$, $n_3$, $n_4$ and $n_5$, respectively.

The equivalent focal length of the embodiment shown in this example is 1.0000 and the paraxial intersectional width for the object of infinite distances is denoted $po'$. The effective system aperture amounts to 0.2857.

A focal length of f=200 mm. has been assumed for the objective according to the invention shown in the drawing.

The focal lengths of the members of the objective according to the following example are:

$$f_{12} = 0.483\ F$$
$$f_3 = -0.324\ F$$
$$f_{45} = 0.612\ F$$

The exact values of radii, thicknesses and distances which yield the above focal lengths, and the characteristics of the respective glasses are stated in the following table.

*Table*

[F=1.0000  1:3.5  $po'$=0.8203]

| | | | | |
|---|---|---|---|---|
| $R_1$=+0.30809 | $d_1$=0.07702 | | $n_1$=1.65110 | $\nu_1$=58.6 |
| $R_2$=−0.89346 | $d_2$=0.01849 | | $n_2$=1.60266 | $\nu_2$=38.4 |
| $R_3$=+5.80308 | $a_1$=0.03521 | | air | |
| $R_4$=−0.80630 | $d_3$=0.01849 | | $n_3$=1.64282 | $\nu_3$=47.9 |
| $R_5$=+0.28344 | $a_2$=0.07179 | $b_1$=0.04625 | diaphragm space | |
| | | $b_2$=0.02554 | | |
| $R_6$=infinite | $d_4$=0.01849 | | $n_4$=1.58241 | $\nu_4$=40.6 |
| $R_7$=+0.32195 | $d_5$=0.07271 | | $n_5$=1.69347 | $\nu_5$=53.5 |
| $R_8$=−0.52991 | | | | |

As shown in the table, $n_5$=1.69347, i. e. distinctly greater than 1.675 relative to yellow light; simultaneously, $n_4$=1.58241 and this value is distinctly smaller than $$\frac{n_3 + n_2}{2}$$

because this arithmetical mean amounts to $$\frac{1.64282 + 1.60266}{2} = 1.62274$$

relative to the same color.

The $\nu$-value difference in the front member is $\nu_1 - \nu_2 = 58.6 - 38.4 = 20.2$. The $\nu$-value difference in the rear member is $\nu_5 - \nu_4 = 53.5 - 40.6 = 12.9$. 105% of 12.9 amount to 13.545 and 205% of 12.9 amount to 26.445. Thus $\nu_1 - \nu_2 = 20.2$ is distinctly greater than 13.545 and distinctly smaller than 26.44.

Furthermore, the sum of these two $\nu$-value differences, i. e. 20.2+12.9 amounts to 33.1, i. e. it is distinctly greater than 27.5. The refraction index of $L_5$, i. e. 1.69347, is distinctly higher than the refraction index of $L_1$, i. e. 1.65110. Moreover, the distance $L_5 \div L_3 = a_2 + d_4 = 0.09028$, i. e. the distance between the converging lens $L_5$ of high refractive power and the inner individual diverging lens $L_3$ is distinctly greater than the distance $L_1 \div L_3 = d_2 + a_1 = 0.05370$, i. e. the distance between lens $L_3$ and the converging lens $L_1$ of lower refractive power.

Furthermore, the values of $n_3$ and $n_5$ are: $n_3$=1.64282 and $n_5$=1.69347. The arithmetical mean of these refraction indices amounts to 1,668,145, i. e. it is distinctly greater than $n_1$=1.65110.

A preferred embodiment of this invention has been described, but numerous changes, omissions, additions, and substitutions can be made without departing from its scope.

What is claimed is:

1. Photographic objective composed of five lenses, which comprises the following members arranged in the direction of light to the photographic image: (a) a front member consisting of two cemented lenses of opposite power, the front lens of which is a converging lens and has a refractive index distinctly higher than 1.63 for yellow light, the cemented contact surface of said lenses having a converging effect and the equivalent focal length of said front member being in the range of 40/100 to 60/100 of the equivalent focal length of the total objective; (b) a diverging lens of unequal curvature, separated from said front member by an air-space, consisting of highly refractive barium-flint-glass having an Abbé number $\nu$ higher than 42, the curvature of said diverging lens being defined by the quotient of its front radius and rear radius being in the range of 2.38 to 3.43, the focal length of said diverging lens being in the range of −22/100 to −44/100 of the equivalent focal length of the total objective; (c) an air-space containing the diaphragm; (d) a converging rear member consisting of two cemented lenses of opposite power, the rear lens of which is a biconvex converging lens and has a refractive index higher than 1.675 for yellow light, said lenses having a converging cemented contact surface convex relative to the diaphragm, the focal length of said rear member being in the range of 45/100 to 75/100 of the equivalent focal length of the total objective.

2. Photographic objective composed of five lenses, which comprises the following members arranged in the direction of light to the photographic image: (a) a front member consisting of two cemented lenses of opposite power, the front lens of which is a converging lens and has a refractive index distinctly higher than 1.63 for yellow light, the cemented contact surface of said lenses having a converging effect and the equivalent focal length of said front member being in the range of 40/100 to 60/100 of the equivalent focal length of the total objective; (b) a diverging lens of unequal curvature, separated from said front member by an air-space, consisting of highly refractive barium-flint-glass having an Abbé number $\nu$ higher than 42, the curvature of said diverging lens being defined by the quotient of its front radius and rear radius being in the range of 2.38 to 3.43, the focal length of said diverging lens being in the range of $-22/100$ to $-44/100$ of the equivalent focal length of the total objective; (c) an air-space containing the diaphragm; (d) a converging rear member consisting of two cemented lenses of opposite power, the rear lens of which is a biconvex converging lens and has a refractive index higher than 1.675 for yellow light, said lenses having a converging cemented contact surface convex relative to the diaphragm, the focal length of said rear member being in the range of 45/100 to 75/100 of the equivalent focal length of the total objective; the radii of curvature of the individual refractive surfaces, having the following values:

$$0.24 F < R_1 < 0.48 F$$
$$0.48 F < -R_2 < 1.68 F$$
$$F < \pm R_3 \leq \infty$$
$$0.68 F < -R_4 < F$$
$$0.20 F < R_5 < 0.36 F$$
$$F < \pm R_6 \leq \infty$$
$$0.24 F < R_7 < 0.48 F$$
$$0.36 F < -R_8 < 0.72 F$$

$R_4$ and $R_5$ meeting the special condition $$8.33 < \frac{R_4}{R_5} \cdot Z < 12.00$$

wherein $F$ stands for the equivalent focal length of the total objective, $Z$ is the aperture number of the initial relative aperture of the total objective and $R_1, R_2, R_3, R_4, R_5, R_6, R_7, R_8$, are the radii of curvature of the lens surfaces arranged in the direction of light to the photographic image.

3. Photographic objective composed of five lenses, which comprises the following members arranged in the direction of light to the photographic image: (a) a front member consisting of two cemented lenses of opposite power, the front lens of which is a converging lens and has a refractive index distinctly higher than 1.63 for yellow light, the cemented contact surface of said lenses having a converging effect and the equivalent focal length of said front member amounting to about 48/100 of the equivalent focal length of the total objective; (b) a diverging lens of unequal curvature, separated from said front member by an air-space, consisting of highly refractive barium-flint-glass having an Abbé number $\nu$ higher than 42, the curvature of said diverging lens being defined by the quotient of its front radius and rear radius being in the range of 2.38 to 3.43, the focal length of said diverging lens amounting to about $-32/100$ of the equivalent focal length of the total objective; (c) an air-space containing the diaphragm; (d) a converging rear member consisting of two cemented lenses of opposite power, the rear lens of which is a biconvex converging lens and has a refractive index higher than 1.675 for yellow light, said lenses having a converging cemented contact surface convex relative to the diaphragm, the focal length of said rear member amounting to about 61/100 of the equivalent focal length of the total objective.

4. Photographic objective composed of five lenses, which comprises the following members arranged in the direction of light to the photographic image: (a) a front member consisting of two cemented lenses of opposite power, the front lens of which is a converging lens and has a refractive index distinctly higher than 1.63 for yellow light, the cemented contact surface of said lenses having a converging effect and the equivalent focal length of said front member amounting to about 48/100 of the equivalent focal length of the total objective; (b) a diverging lens of unequal curvature, separated from said front member by an air-space, consisting of highly refractive barium-flint-glass having an Abbé number $\nu$ higher than 42, the curvature of said diverging lens being defined by the quotient of its front radius and rear radius being in the range of 2.38 to 3.43, the focal length of said diverging lens amounting to about $-32/100$ of the equivalent focal length of the total objective; (c) an air-space containing the diaphragm; (d) a converging rear member consisting of two cemented lenses of opposite power, the rear lens of which is a biconvex converging lens and has a refractive index higher than 1.675 for yellow light, said lenses having a converging cemented contact surface convex relative to the diaphragm, the focal length of said rear member amounting to about 61/100 of the equivalent focal length of the total objective; the focal lengths of said members being reciprocal values of the corresponding refractive powers and having the following values for the individual refractive surfaces:

$R_1$ is about $+\dfrac{30}{100} F$ $R_2$ is about $-\dfrac{90}{100} F$ $R_3$ is about $+\dfrac{600}{100} F$ $R_4$ is about $-\dfrac{80}{100} F$ $R_5$ is about $+\dfrac{30}{100} F$ $R_6$ is about $\pm \infty$ $R_7$ is about $+\dfrac{30}{100} F$ $R_8$ is about $-\dfrac{50}{100} F$ wherein $F$ stands for the equivalent focal length of the total objective, $Z$ is the aperture number of the initial relative aperture of the total objective and $R_1, R_2, R_3, R_4, R_5, R_6, R_7, R_8$, are the radii of curvature of the lens surfaces arranged in the direction of light to the photographic image.

ALBRECHT WILHELM TRONNIER.

References Cited in the file of this patent

UNITED STATES PATENTS

| Number | Name | Date |
|---|---|---|
| 716,035 | Harting | Dec. 16, 1902 |
| 765,006 | Harting | July 12, 1904 |
| 1,421,156 | Booth | June 27, 1922 |
| 2,279,384 | Altman | Apr. 14, 1942 |
| 2,417,736 | Cox | Mar. 18, 1947 |

FOREIGN PATENTS

| Number | Country | Date |
|---|---|---|
| 535,480 | Great Britain | Apr. 10, 1941 |
| 601,837 | Great Britain | May 13, 1948 |